(12) United States Patent
Park et al.

(10) Patent No.: US 12,201,045 B2
(45) Date of Patent: Jan. 21, 2025

(54) FRAME APPARATUS FOR AGRICULTURAL WORK VEHICLE

(71) Applicant: LS MTRON LTD., Anyang-si (KR)

(72) Inventors: Ji Soo Park, Anyang-si (KR); Hyo Jong Chon, Anyang-si (KR); Han Yeol Yu, Anyang-si (KR); Joon Hyung Kim, Anyang-si (KR)

(73) Assignee: LS MTRON LTD., Anyang-si (KR)

( * ) Notice: Subject to any disclaimer, the term of this patent is extended or adjusted under 35 U.S.C. 154(b) by 0 days.

(21) Appl. No.: 18/378,382

(22) Filed: Oct. 10, 2023

(65) Prior Publication Data

US 2024/0130261 A1 Apr. 25, 2024
US 2024/0224830 A9 Jul. 11, 2024

(30) Foreign Application Priority Data

Oct. 19, 2022 (KR) .......................... 10-2022-0134913

(51) Int. Cl.
*B62D 49/06* (2006.01)
*A01B 51/02* (2006.01)
*B62D 21/02* (2006.01)

(52) U.S. Cl.
CPC .............. *A01B 51/02* (2013.01); *B62D 21/02* (2013.01); *B62D 49/065* (2013.01)

(58) Field of Classification Search
CPC ....... A01B 51/02; A01B 59/064; A01B 33/12; B62D 21/02; B62D 49/065; B62D 21/186; B60Y 2200/22
See application file for complete search history.

(56) References Cited

U.S. PATENT DOCUMENTS

| 5,361,850 A | 11/1994 | Muller et al. |
| 6,056,502 A | 5/2000 | Takemura et al. |
| 6,446,367 B1 * | 9/2002 | Muramoto ............. E02F 3/627 172/275 |
| 6,604,787 B1 * | 8/2003 | Brockman ............. B60N 2/68 297/216.13 |
| 6,729,431 B2 | 5/2004 | Osuga et al. |
| 2003/0010563 A1 * | 1/2003 | Osuga ................... B62D 49/02 180/311 |

FOREIGN PATENT DOCUMENTS

JP 2017077796 A 4/2017

* cited by examiner

*Primary Examiner* — Karen Beck
(74) *Attorney, Agent, or Firm* — K&L Gates LLP (57) ABSTRACT

Disclosed herein is a frame apparatus for an agricultural work vehicle. The frame apparatus includes: an engine frame configured to support the engine of an agricultural work vehicle; a front frame connected to each of a front work machine and the engine frame to support the front work machine mounted in front of the agricultural work vehicle; a center case spaced apart from the front frame based on a first axis direction, and disposed behind the engine frame; a rear axle case coupled to the rear of the center case; side frames each coupled to each of the front frame and the rear axle case on both sides of the agricultural work vehicle; and a crossbar coupled to the side frames while connecting the side frames on both sides based on a second axis direction perpendicular to the first axis direction.

6 Claims, 5 Drawing Sheets

FRAME APPARATUS FOR AGRICULTURAL WORK VEHICLE

CROSS-REFERENCE TO RELATED APPLICATION

This application claims the benefit of Korean Patent Application No. 10-2022-0134913 filed on Oct. 19, 2022, which is hereby incorporated by reference herein in its entirety.

FIELD

The present disclosure relates to an agricultural work vehicle that is used to grow crops required for human life by using land.

BACKGROUND

Agricultural work vehicles are used to grow crops required for human life by using land. For example, combines, tractors, etc. are agricultural work vehicles. Combines are used to cut and thresh crops such as rice, barley, wheat, soybeans, etc. Tractors perform the work required to grow crops by using traction force.

These agricultural work vehicles are equipped with work machines to enable them to perform more diverse tasks. For example, an agricultural work vehicle may be equipped with a rear work machine such as a backhoe work machine. A backhoe machine is used to perform excavation work.

Such a conventional agricultural work vehicle may be provided with a vehicle body and a frame apparatus configured to support the vehicle body. The frame apparatus may support the load applied by the vehicle body of the agricultural work vehicle. For example, when the agricultural work vehicle moves on an uneven road surface such as the surface of a work site, the load may not be uniformly distributed on the frame apparatus.

When the rear work machine is driven for the excavation work of the conventional agricultural work vehicle, the load may be concentrated on the rear of the agricultural work vehicle. As the loads applied to the front and rear of the agricultural work vehicle are different, bending external force is applied to the frame apparatus. Accordingly, the frame apparatus for the conventional agricultural work vehicle has a problem in that the frame apparatus is damaged or another member installed on the agricultural work vehicle is damaged as external bending force accumulates.

In addition, when the rear work machine of the conventional agricultural work vehicle is rotated in the left and right directions of the vehicle body, the load may be concentrated in the left and right directions of the vehicle body. In this case, the load may be concentrated in the left and right directions of the frame apparatus. Accordingly, torsional external force is applied to the frame apparatus of the conventional agricultural work vehicle by the load concentrated in the left and right directions. Therefore, the frame apparatus of the conventional agricultural work vehicle has a problem in that the frame apparatus is damaged or another member installed on the agricultural work vehicle is damaged as torsional external force accumulates.

SUMMARY

The present disclosure has been conceived to overcome the above-described problems, and an object of the present disclosure is to provide a frame apparatus for an agricultural work vehicle that can prevent damage attributable to bending and torsional loads.

In order to overcome the above-described problems, the present disclosure may include the following configuration.

A frame apparatus for an agricultural work vehicle according to the present disclosure may include: an engine frame configured to support the engine of an agricultural work vehicle; a front frame connected to each of a front work machine and the engine frame to support the front work machine mounted in front of the agricultural work vehicle; a center case spaced apart from the front frame based on a first axis direction, and disposed behind the engine frame; a rear axle case coupled to the rear of the center case; side frames each coupled to each of the front frame and the rear axle case on both sides of the agricultural work vehicle; and a crossbar coupled to the side frames while connecting the side frames on both sides based on a second axis direction perpendicular to the first axis direction.

A frame apparatus for an agricultural work vehicle according to the present disclosure may include: an engine frame configured to support the engine of an agricultural work vehicle; a front frame connected to each of a front work machine and the engine frame to support the front work machine mounted in front of the agricultural work vehicle; a center case spaced apart from the front frame based on a first axis direction, and disposed behind the engine frame; a rear axle case coupled to the rear of the center case; side frames each coupled to each of the front frame and the rear axle case; and reinforcing parts disposed between the side frames and the engine frame, and each coupled to each of the side frame and the engine frame.

BRIEF DESCRIPTION OF THE DRAWINGS

The above and other objects, features, and advantages of the present disclosure will be more clearly understood from the following detailed description taken in conjunction with the accompanying drawings, in which.

DETAILED DESCRIPTION

A frame apparatus for an agricultural work vehicle according to an embodiment of the present disclosure will be described in detail below with reference to the accompanying drawings.

Figure 1:
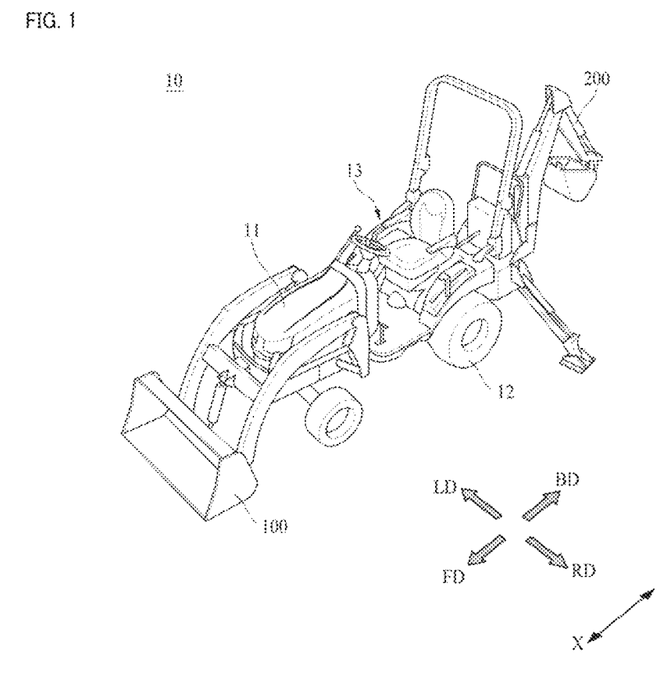
FIG. 1 is a schematic perspective view of an agricultural work vehicle.
Figure 2:
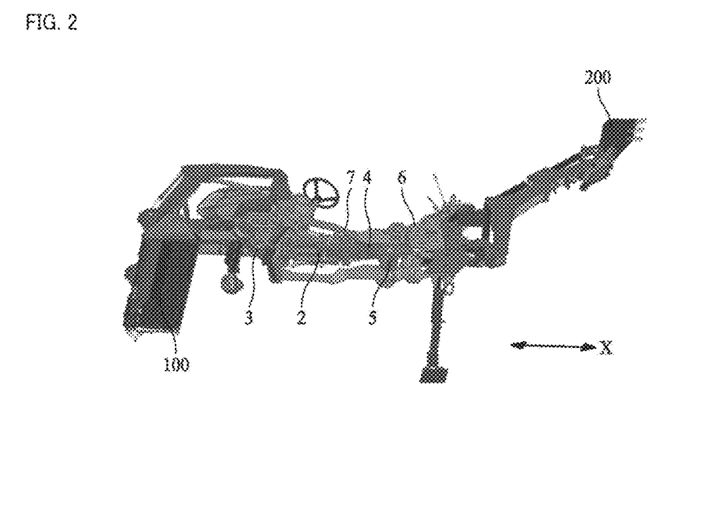
FIG. 2 is a schematic perspective view of a frame apparatus for an agricultural work vehicle according to the present disclosure.

Referring to FIGS. 1 and 2, a frame apparatus 1 for an agricultural work vehicle according to the present disclosure is installed on an agricultural work vehicle 10. The agricultural work vehicle 10 is used to grow crops required for human life by using land. The agricultural work vehicle 1 may be a tractor, a combine, or the like.

The frame apparatus 1 for an agricultural work vehicle according to the present disclosure may include: an engine frame 2 intended to support the engine (not shown) of the agricultural work vehicle 10; a front frame 3 connected to each of a front work machine 100 and the engine frame 2 to support the front work machine 100 mounted in front of the agricultural work vehicle 10; a center case 4 spaced apart from the front frame 3 based on a first axis direction (the X-axis direction), and disposed behind the engine frame 2; a rear axle case 5 coupled to the rear of the center case 4; side frames 7 coupled to the front frame 3 and the rear axle case 5 on both sides of the agricultural work vehicle 10; and a crossbar 8 coupled to the side frames 7 on both sides based on a second axis direction (the Y-axis direction) perpendicular to the first axis direction (the X-axis direction) while connecting the side frames 7.

Accordingly, the frame apparatus 1 for an agricultural work vehicle according to the present disclosure may achieve the following operational effects.

The frame apparatus 1 for an agricultural work vehicle according to the present disclosure may be implemented such that the load concentrated on the front (the direction of arrow FD) or rear (the direction of arrow BD) of the agricultural work vehicle by a rear work machine 200 is uniformly distributed by the crossbar 8. Accordingly, the frame apparatus 1 for an agricultural work vehicle according to the present disclosure may not only reduce the deformation generated in the center case 4 due to an unbalanced load, but may also prevent the center case 4 from being damaged or broken. Therefore, the frame apparatus 1 for an agricultural work vehicle according to the present disclosure may contribute to increasing the durability of the agricultural work vehicle 10.

Furthermore, the frame apparatus 1 for an agricultural work vehicle according to the present disclosure may include reinforcing parts 9 disposed between the side frames 7 and the engine frame 2 and coupled to the side frames 7 and the engine frame 2.

Accordingly, the frame apparatus 1 for an agricultural work vehicle according to the present disclosure can achieve the following operational effects.

The frame apparatus 1 for an agricultural work vehicle according to the present disclosure may be implemented such that the load concentrated in the left direction (the direction of arrow LD) or right direction (the direction of arrow RD) of the agricultural work vehicle 10 by the rear work machine 200 is uniformly distributed by the reinforcing parts 9. Accordingly, the frame apparatus 1 for an agricultural work vehicle according to the present disclosure may not only reduce the deformation generated in the center case 4 due to an unbalanced load, but also prevent the center case 4 from being damaged or broken. Therefore, the frame apparatus 1 for an agricultural work vehicle according to the present disclosure may contribute to increasing the durability of the agricultural work vehicle 10.

The engine frame 2, the front frame 3, the center case 4, the rear axle case 5, the rear frame 6, the side frames 7, the crossbar 8, and the reinforcing parts 9 will be described in detail below with reference to the accompanying drawings.

Referring to FIGS. 1 and 2, the engine frame 2 supports the engine. The engine frame 2 may be installed in the vehicle body 11 of the agricultural work vehicle 10. The engine frame 2 may support not only the engine, but also the vehicle body 11 and mechanisms installed in the vehicle body 11. In other words, the engine frame 2 may serve as a framework for the agricultural work vehicle 10. Wheels 12 may be installed on the vehicle body 11. As the drive force generated by the engine is transmitted through the wheels 12, the vehicle body 11 may move along a traveling direction (the X-axis direction). In this case, the traveling direction is the direction of an axis parallel to the forward direction (the direction of arrow FD) in which the vehicle body 2 moves forward and the rearward direction (the direction of arrow BD) in which the vehicle body 2 moves rearward. The vehicle body 11 may be provided with a driver's seat 13 for a driver to sit on. The vehicle body 11 may be provided with a driver's seat 13. As the driver sits on the driver's seat 13 and operates a steering device and an operating device, the agricultural work vehicle 1 may perform predetermined tasks. Although not shown in the drawings, a transmission configured to connect the engine and the wheel 12 may be installed on the engine frame 2.

Referring to FIGS. 1 and 2, the front frame 3 supports the front work machine 100 mounted on the agricultural work vehicle 10. The front frame 3 may be connected to each of the front work machine 100 and the engine frame 2. Accordingly, the front frame 3 and the engine frame 2 may share and support the load applied by the front work machine 100. Accordingly, the frame apparatus 1 for an agricultural work vehicle according to the present disclosure may be implemented to provide sufficient support force for the front work machine 100 while reducing an increase in the weight of the engine frame 2.

The front frame 3 may support the front work machine 100 which is mounted in front of the agricultural work vehicle 10 (in the direction of arrow FD). For example, the front work machine 100 may be a loader work machine which is used to remove or move soil in front of the agricultural work vehicle 10 (in the direction of arrow FD). One side of the front frame 3 may be connected to the front working machine 100, and the other side thereof may be connected to the engine frame 2.

Figure 3:
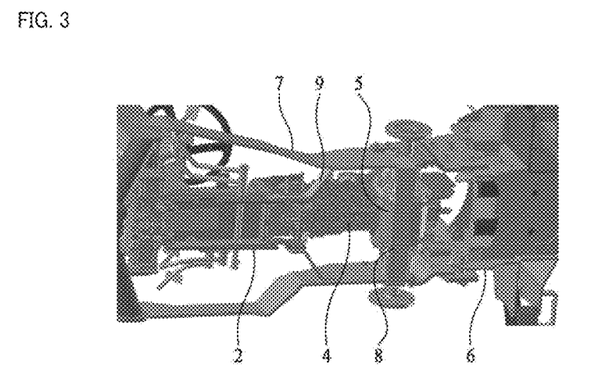
FIG. 3 is a schematic perspective view showing a state in which a crossbar and reinforcing parts are coupled in the frame apparatus for an agricultural work vehicle according to the present disclosure.

Referring to FIGS. 1 and 3, the center case 4 is spaced apart based on the first axis direction (the X-axis direction) and is disposed behind the engine frame 2. The center case 4 may be disposed between the engine frame 2 and the rear axle case 5. The center case 4 may be coupled to each of the engine frame 2 and the rear axle case 5. A transmission shaft (not shown) may be installed in the center case 4 to transmit the drive force generated by the engine. The center case 4 may be disposed to surround the outside of the transmission shaft to protect the transmission shaft. The drive force generated by the engine may be transmitted to the wheels 12, coupled to the rear of the agricultural work vehicle 10 (in the direction of arrow BD), through the transmission shaft.

Referring to FIGS. 1 and 3, the rear axle case 5 is coupled to the rear of the center case 4. The rear axle case 5 may be disposed between the center case 4 and the rear frame 6. The rear axle case 5 may be coupled to each of the center case 4 and the rear frame 6. The rear axle case 5 may be connected to the wheels 12 installed in the rear of the vehicle body 11 (in the direction of arrow BD).

Referring to FIGS. 1 and 3, the rear axle case 5 may include a rear axle body 51 and a rear axle coupling member 52.

The rear axle body 51 is disposed between the center case 4 and the rear frame 6. The rear axle body 51 may be disposed between the center case 4 and the rear frame 6 based on the first axis direction (the X-axis direction). The rear axle body 51 may be coupled to each of the center case 4 and the rear frame 6. A device for converting the drive force transmitted from the engine may be installed on the rear axle body 51. The rear axle body 51 may be disposed inside the crossbar 8. In this case, the rear axle body 51 may be disposed inside the crossbar 8 based on the second axis direction (the Y-axis direction). The side frames 7 may be disposed between the rear axle body 51 and the crossbar 8.

The rear axle coupling member 52 is intended to be coupled to the rear axle body 51. The rear axle coupling member 52 may couple the side frames 7 to the rear axle body 51. Furthermore, the rear axle coupling member 52 may couple the crossbar 8 to the rear axle body 51. The rear axle coupling member 52 may simultaneously couple the side frames 7 and the crossbar 8 to the rear axle body 51. The side frames 7, the crossbar 8, and the rear axle body 51 may be coupled to each other in close contact with each other by the rear axle coupling member 52. The rear axle coupling member 52 may penetrate the side frames 7 and the crossbar 8 and be coupled to the side frames 7 and the crossbar 8. In this case, the rear axle coupling member 52 may be coupled to the rear axle case 5 in such a manner as to penetrate the crossbar 8, the side frames 7, and the crossbar 8. Accordingly, the crossbar 8, side frames 7, and rear axle body 51 of the agricultural work vehicle 10 according to the present disclosure may be coupled in an overlapping manner.

Referring to FIGS. 1 and 2, the rear frame 6 is intended to support the rear work machine 200 mounted on the agricultural work vehicle 10. The rear frame 6 may be connected to each of the rear working machine 200 and the engine frame 2. Accordingly, the rear frame 6 and the engine frame 2 may share and support the load applied by the rear working machine 200. Therefore, the frame apparatus 1 for an agricultural work vehicle according to the present disclosure may be implemented to provide sufficient support for the rear work machine 200 while reducing an increase in the weight of the engine frame 2.

The rear frame 6 may support the rear working machine 200 which is mounted behind the agricultural work vehicle 10 (in the direction of arrow BD). For example, the rear work machine 200 may be a backhoe work machine which is used to perform excavation work behind the agricultural work vehicle 10 (in the direction of arrow BD). One side of the rear frame 6 may be connected to the rear working machine 200, and the other side thereof may be connected to the engine frame 2.

Referring to FIGS. 1 to 4, the side frames 7 are coupled to the front frame 3 and the rear axle case 5 on both sides of the agricultural work vehicle 10, respectively. The side frames 7 may be formed to extend based on the first axis direction (the X-axis direction). The side frames 7 may protect the front frame 3, the engine frame 2, the center case 4, and the rear axle case 5 which are disposed along the first axis direction (the X-axis direction). The side frames 7 may serve to support the left and right directions of the agricultural work vehicle 10.

Referring to FIGS. 1 to 5, the frame apparatus 1 for an agricultural work vehicle according to the present disclosure may include a plurality of side frames 7. In this case, the side frames 7 may include a first side member 71 and a second side member 72.

The first side member 71 is used to form an outer framework in the frame apparatus 1 for an agricultural work vehicle according to the present disclosure. The first side member 71 is spaced apart from the second side member 72 based on the second axis direction (the Y-axis direction). The first side member 71 may be disposed to face the second side member 72 along the second axis direction (the Y-axis direction).

The second side member 72 is spaced apart from the first side member 71 based on the second axis direction (the Y-axis direction). The second side member 72 may be disposed to face the first side member 71 along the second axis direction (the Y-axis direction). In this way, the second side member 72 and the first side member 71 may serve to support both sides of the frame apparatus 1 for an agricultural work vehicle according to the present disclosure. The second side member 72 may form the outer framework of the frame apparatus 1 for an agricultural work vehicle according to the present disclosure together with the first side member 71. For example, the second side member 72 and the first side member 71 may be disposed on both sides of the engine frame 2, the center case 4, and the rear axle case 5. The second side member 72 and the first side member 71 may protect the engine frame 2, the center case 4, and the rear axle case 5 on both sides of the engine frame 2, the center case 4, and the rear axle case 5 based on the first axis direction (the X-axis direction).

Figure 4:
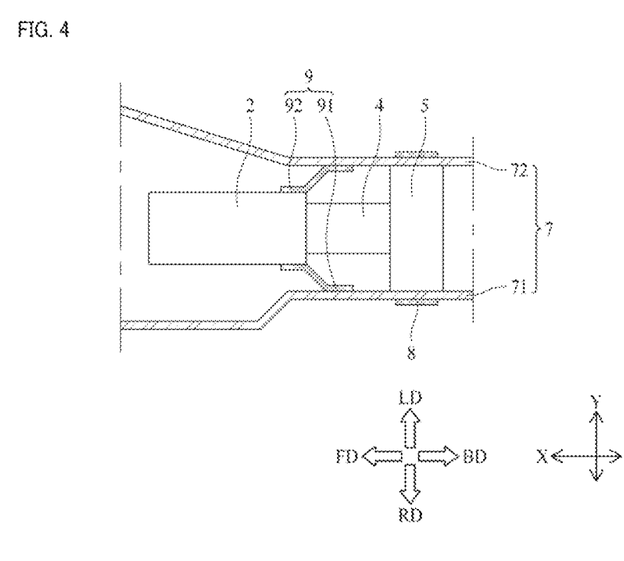
FIG. 4 is a schematic plan view of the frame apparatus for an agricultural work vehicle according to the present disclosure.

Meanwhile, although the first side member 71 and the second side member 72 are shown as having different shapes in FIGS. 2 to 4, the shapes are not limited thereto. In some cases, the first side member 71 and the second side member 72 may have the same shape and be disposed symmetrically with respect to the first axis direction (the X-axis direction).

The plurality of side frames 7 may be coupled to each of the front frame 3 and the rear axle case 5. In this case, the side frames 7 may be disposed outside the front frame 3 and the rear axle case 5 based on the second axis direction (the Y-axis direction). The engine frame 2 and the center case 4 coupled along the first axis direction (the X-axis direction) may be disposed inside the side frames 7 based on the second axis direction (the Y-axis direction).

Referring to FIGS. 1 to 4, the crossbar 8 is coupled to the side frames 7. The crossbar 8 connects the side frames 7 on both sides based on the second axis direction (the Y-axis direction), and may be coupled to the side frames 7. The crossbar 8 may be coup led to the side frames 7 to be disposed behind of the center case 4 (in the direction of arrow BD) based on the first axis direction (the X-axis direction). In this case, the crossbar 8 may be coupled to the rear axle case 5 to overlap the side frames 7. Accordingly, the frame apparatus 1 for an agricultural work vehicle according to the present disclosure may be implemented such that the external force generated due to the use of the rear work machine 200 is distributed to the crossbar 8. Therefore, the frame apparatus 1 for an agricultural work vehicle according to the present disclosure may prevent the center case 4, etc. disposed in front of the crossbar 8 (in the direction of arrow FD) based on the first axis direction (the X-axis direction) from being deformed or damaged through the crossbar 8.

Referring to FIGS. 1 to 5, the crossbar 8 may include a first coupling member 81, a second coupling member 82, and a cross member 83.

Figure 5:
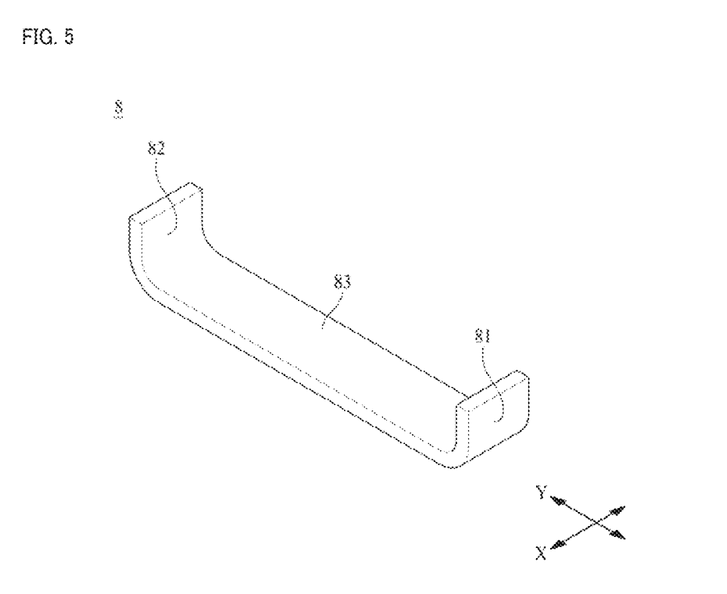
FIG. 5 is a schematic perspective view of a crossbar in the frame apparatus for an agricultural work vehicle according to the present disclosure.

The first coupling member 81 is coupled to the side frame 7 on one side. The first coupling member 81 may be coupled to the first side member 71. The first coupling member 81 may be disposed spaced apart from the second coupling member 82 based on the second axis direction (the Y-axis direction). A coupling hole (not shown) configured to couple the rear axle coupling member 52 may be formed in the first coupling member 81. The first coupling member 81 may be disposed parallel to the first side member 71.

The second coupling member 82 is coupled to the side frame 7 on the other side. In this case, it may be disposed spaced apart from the first coupling member 81 based on the second axis direction (the Y-axis direction). The second coupling member 82 may be coupled to the second side member 72. A coupling hole (not shown) configured to couple the rear axle coupling member 52 may be formed in the second coupling member 82. The second coupling member 82 may be disposed parallel to the second side member 72.

The cross member 83 is coupled to each of the first coupling member 81 and the second coupling member 82. The cross member 83 may be formed to extend along the second axis direction (the Y-axis direction). The cross member 83 may have a plate-shaped structure. The cross member 83 may be coupled to the first coupling member 81 and the second coupling member 82 in the vertical direction. The cross member 83 may be implemented to extend in the left direction (the direction of arrow LD) and right direction (the direction of arrow RD) of the agricultural work vehicle 10 and support the load that is concentrated in the left direction (the direction of arrow LD) and right direction (the direction of arrow RD) of the agricultural work vehicle 10. Accordingly, the frame apparatus 1 for an agricultural work vehicle according to the present disclosure may be implemented such that the cross member 83 supports the torsional external force that is caused by the load that is concentrated in the left direction (the direction of arrow LD) and right direction (the direction of arrow RD) of the agricultural work vehicle 10. Accordingly, the frame apparatus 1 for an agricultural work vehicle according to the present disclosure may prevent the center case 4 from being deformed or damaged due to torsional external force through the cross member 83.

The cross member 83 may have a plate-shaped shape that extends and is disposed in the second axis direction (the Y-axis direction). The cross member 83 may be disposed spaced apart from the side frames 7. The cross member 83, the first coupling member 81, and the second coupling member 82 may be formed in an integrated manner.

Figure 6:
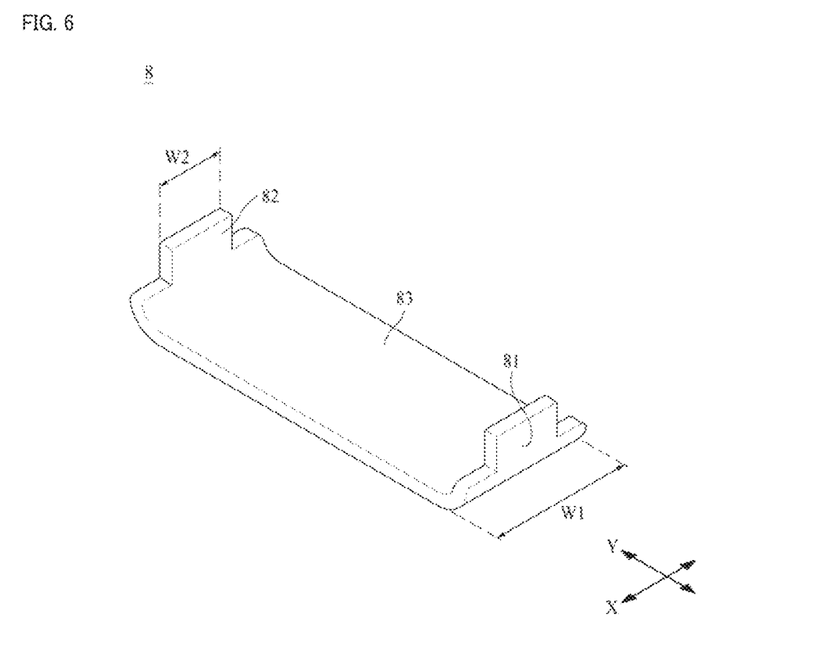
FIG. 6 is a schematic perspective view of a crossbar according to another embodiment in the frame apparatus for an agricultural work vehicle according to the present disclosure.

Referring to FIG. 6, the width W1 of the cross member 83 may be formed larger than the width W2 of the first coupling member 81 based on the first axis direction (the X-axis direction). Accordingly, in the frame apparatus 1 for an agricultural work vehicle according to the present disclosure, the cross member 83 has a large sectional area compared to the case where the first coupling member 81 is formed to have the same width, so that the stress which the cross member 83 has increases. Accordingly, the strength of the frame apparatus 1 for an agricultural work vehicle according to the present disclosure is enhanced through the cross member 83, thereby preventing deformation or damage attributable to external force. In this case, when a load (external force) such as compression, tension, bending, or torsion, is applied to a material, the resistance generated within the material in accordance with the magnitude of the load is referred to as "stress." In general, as the sectional area of the material increases, the stress increases.

Figure 7:
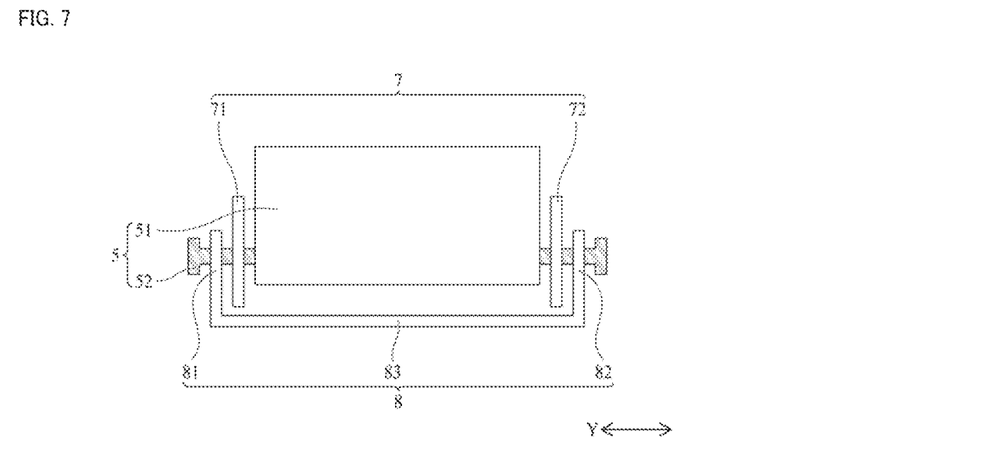
FIG. 7 is a view showing a state in which a rear axle case, side frames, and a crossbar are coupled to each other in the frame apparatus for an agricultural work vehicle according to one embodiment of the present disclosure.

Referring to FIG. 7, based on the second axis direction (the Y-axis direction), the side frames 7 may be coupled to the rear axle case 5 so that they can be disposed inside the crossbar 8. Accordingly, the frame apparatus 1 for an agricultural work vehicle according to the present disclosure may be implemented such that the crossbar 8 is directly coupled to the side frames 7. Therefore, in the frame apparatus 1 for an agricultural work vehicle according to the present disclosure, the crossbar 8 may support the side frames 7 disposed on the outside based on the second axis direction (the Y-axis direction), and may thus protect the center case 4, etc. disposed inside the side frames 7.

The side frames 7 may be disposed inside the crossbar 8 based on the second axis direction (the Y-axis direction). In this case, the first coupling member 81 and the second coupling member 82 may be disposed parallel to the side frames 7. The side frames 7 may be disposed between the first coupling member 81 and the second coupling member 82. The rear axle body 51 may be disposed between the side frames 7. In this case, based on the second axis direction (the Y-axis direction), the first side member 71 may be disposed between the first coupling member 81 and the rear axle body 51. Accordingly, the rear axle coupling member 52 may sequentially penetrate the first coupling member 81 and the first side member 71 and be coupled to the rear axle body 51. Therefore, the frame apparatus 1 for an agricultural work vehicle according to the present disclosure has a triple support structure in which the first coupling member 81, the first side member 71, and the rear axle body 51 are coupled to overlap each other along the second axis direction (the Y-axis direction), so that the stress used to withstand external force can be strengthened.

Based on the second axis direction (the Y-axis direction), the second side member 72 may be disposed between the second coupling member 82 and the rear axle body 51. Accordingly, the rear axle coupling member 52 may sequentially penetrate the second coupling member 82 and the second side member 72 and be coupled to the rear axle body 51. Therefore, the frame apparatus 1 for an agricultural work vehicle according to the present disclosure has a triple support structure in which the second coupling member 82, the second side member 72, and the rear axle body 51 are coupled to overlap each other along the second axis direction (the Y-axis direction), so that the stress used to withstand external force can be strengthened.

Figure 8:
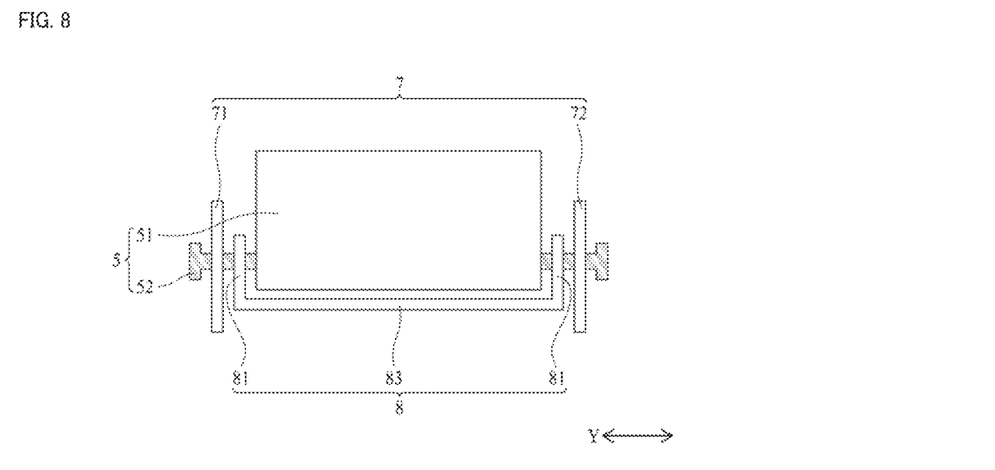
FIG. 8 is a view showing a state in which a rear axle case, side frames, and a crossbar are coupled to each other in the frame apparatus for an agricultural work vehicle according to another embodiment of the present disclosure.

Referring to FIG. 8, based on the second axis direction (the Y-axis direction), the crossbar 8 may be coupled to the rear axle case 5 so that the crossbar 8 can be disposed inside the side frames 7. Accordingly, the frame apparatus 1 for an agricultural work vehicle according to the present disclosure may be implemented such that the crossbar 8 is disposed at a higher position in the height direction. Therefore, in the frame apparatus 1 for an agricultural work vehicle according to the present disclosure, the distance by which the crossbar 8 is spaced apart form a road surface is increased, so that a collision with an object such as a stone can be prevented while the agricultural work vehicle moves along an uneven road surface such as the surface of a work site. Through this, the frame apparatus 1 for an agricultural work vehicle according to the present disclosure may prevent the crossbar 8 from being damaged.

The crossbar 8 may be disposed between the side frames 7 based on the second axis direction (the Y-axis direction). The first coupling member 81 and the second coupling member 82 may be disposed parallel to the side frames 7. The rear axle body 51 may be disposed between the first coupling member 81 and the second coupling member 82. Based on the second axis direction (the Y-axis direction), the first coupling member 81 may be disposed between the first side member 71 and the rear axle body 51. Accordingly, the rear axle coupling member 52 may sequentially penetrate the first side member 71 and the first coupling member 81 and be coupled to the rear axle body 51. Therefore, the frame apparatus 1 for an agricultural work vehicle according to the present disclosure has a triple support structure in which the first side member 71, the first coupling member 81, and the rear axle body 51 are coupled to overlap each other along the second axis direction (the Y-axis direction), so that the stress used to withstand external force can be strengthened.

Based on the second axis direction (the Y-axis direction), the second coupling member 82 may be disposed between the second side member 72 and the rear axle body 51. Accordingly, the rear axle coupling member 52 may sequentially pass through the second side member 72 and the second coupling member 82 and be coupled to the rear axle body 51. Therefore, the frame apparatus 1 for an agricultural work vehicle according to the present disclosure has a triple support structure in which the second side member 72, the second coupling member 82, and the rear axle body 51 are coupled to overlap each other along the second axis direction (the Y-axis direction), so that the stress used to withstand external force can be strengthened.

Referring to FIGS. 1 to 9, the reinforcing parts 9 are each coupled to each of the side frame 7 and the engine frame 2. The reinforcing parts 9 may be disposed spaced apart from the crossbar 8 based on the first axis direction (the X-axis direction). Accordingly, the frame apparatus 1 for an agricultural work vehicle according to the present disclosure may be implemented such that the crossbar 8 and the reinforcing parts 9 support external force at positions spaced apart from each other. Therefore, in the frame apparatus 1 for an agricultural work vehicle according to the present disclosure, the stress used to withstand external force may be strengthened through the crossbar 8 and the reinforcing parts 9.

Referring to FIGS. 1 to 9, the frame apparatus 1 for an agricultural work vehicle according to the present disclosure may include a plurality of the reinforcing parts 9. In this case, the reinforcing parts 9 may include a first reinforcing member 91 and a second reinforcing member 92. The first reinforcing member 91 and the second reinforcing member 92 may be disposed symmetrical to each other with respect to the first axis direction (the X-axis direction). In this case, the first reinforcing member 91 and the second reinforcing member 92 may be disposed to face each other along the second axis direction (the Y-axis direction).

Figure 9:
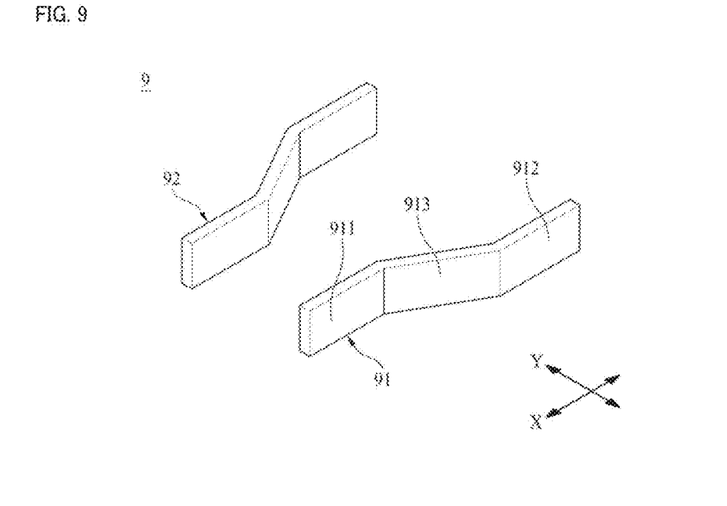
FIG. 9 is a schematic perspective view of reinforcing parts in the frame apparatus for an agricultural work vehicle according to the present disclosure.

The first reinforcing member 91 may include a first reinforcing coupling member 911, a second reinforcing coupling member 912, and a reinforcing connection member 913.

The first reinforcing coupling member 911 is coupled to the engine frame 2. The first reinforcing coupling member 911 may be coupled to one side of the engine frame 2. The first reinforcing coupling member 911 may be disposed between the side frame 7 and the engine frame 2. The first reinforcing coupling member 911 may be coupled to the engine frame 2 through a separate member.

The second reinforcing coupling member 912 is coupled to the side frame 7. The second reinforcing coupling member 912 may be disposed behind the first reinforcing coupling member 911 (in the direction of arrow BD) based on the first axis direction (the X-axis direction). Accordingly, in the frame apparatus 1 for an agricultural work vehicle according to the present disclosure, the second reinforcing coupling member 912 and the second reinforcing coupling member 912 may be coupled to the side frames 7 at positions spaced apart from each other along the first axis direction (the X-axis direction). Therefore, in the frame apparatus 1 for an agricultural work vehicle according to the present disclosure, the stress for external bending force attributable to the load concentrated on the front (in the direction of arrow FD) or rear (in the direction of arrow BD) of the agricultural work vehicle 10 through the first reinforcing coupling member 911 and the second reinforcing coupling member 912 may be strengthened. Through this, the frame apparatus 1 for an agricultural work vehicle according to the present disclosure my prevent the center case 4, etc. disposed inside the side frame 7 from being deformed or damaged due to external bending force.

Meanwhile, the second reinforcing coupling member 912 and the side frame 7 may be formed separately and coupled to each other by another member. Additionally, the second reinforcing coupling member 912 and the side frame 7 may be formed in an integrated manner.

Figure 10:
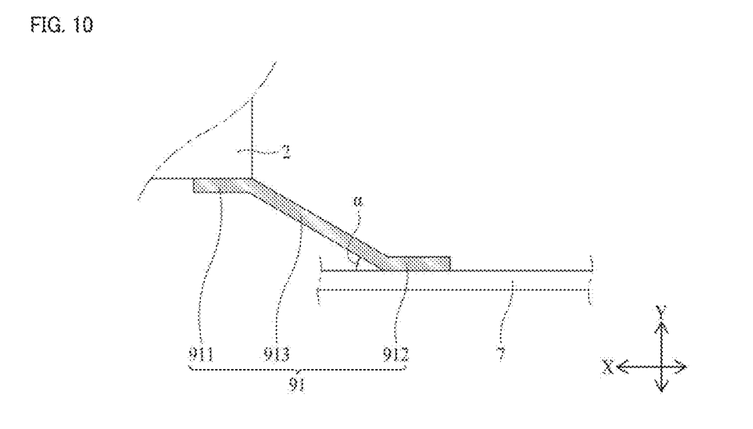
FIG. 10 is a conceptual plan view showing a situation in which each of the reinforcing parts is coupled in the frame apparatus for an agricultural work vehicle according to the present disclosure.

Referring to FIG. 10, the reinforcing connection member 913 connects the first reinforcing coupling member 911 and the second reinforcing coupling member 912. The reinforcing connection member 913 may be disposed between the first reinforcing coupling member 911 and the second reinforcing coupling member 912. In this case, the reinforcing connection member 913 may be coupled to each of the first reinforcing coupling member 911 and the second reinforcing coupling member 912. The reinforcing connection member 913 may be disposed in a diagonal direction. In this case, the angle formed between the reinforcing connection member 913 and the side frame 7 may be an acute angle. In other words, the included angle α between the reinforcing connection member 913 and the side frame 7 may be formed as an acute angle. Accordingly, the frame apparatus 1 for an agricultural work vehicle according to the present disclosure may be implemented such that the reinforcing connection member 913 is disposed in a diagonal direction. Therefore, in the frame apparatus 1 for an agricultural work vehicle according to the present disclosure, the reinforcing connection member 913 has a wider sectional area, so that the stress used to resist external force can be strengthened.

The reinforcing connection member 913 may be formed longer than the shortest distance by which the engine frame 2 and the side frame 7 are spaced apart from each other. Accordingly, the reinforcing connection member 913 may not be disposed in a straight line along the shortest distance between the engine frame 2 and the side frame 7, but may be disposed in a diagonal direction. Accordingly, the reinforcing connection member 913 may have a large sectional area compared to the case where it is disposed in a straight direction along the second axis direction (the Y-axis direction).

Meanwhile, the first reinforcing coupling member 911, the second reinforcing coupling member 912, and the reinforcing connecting member 913 may be formed in an integrated manner.

According to the present disclosure, the following effects may be achieved:

The present disclosure is implemented to share and support the load that is concentrated on the left or right side of an agricultural work vehicle by a rear work machine, so that deformation occurring in the center case can be reduced, and also the center case can be prevented from being damaged or broken, thus contributing to increasing the durability of the agricultural work vehicle.

The present disclosure is implemented to share and support the load that is concentrated on the front or rear of an agricultural work vehicle by a rear work machine, so that deformation occurring in the center case can be reduced, and also the center case can be prevented from being damaged or broken, thus contributing to increasing the durability of the agricultural work vehicle.

The present disclosure described above is not limited to the above-described embodiments and the accompanying drawings. It will be apparent to a person having ordinary skill in the art to which the present disclosure pertains that various substitutions, modifications, and changes may be made without departing from the technical spirit of the present disclosure.

What is claimed is:

1. A frame apparatus for an agricultural work vehicle, the frame apparatus comprising:
   an engine frame configured to support an engine of an agricultural work vehicle;
   a front frame connected to each of a front work machine and the engine frame to support the front work machine mounted in front of the agricultural work vehicle;
   a center case spaced apart from the front frame based on a first axis direction, and disposed behind the engine frame;
   a rear axle case coupled to a rear of the center case;
   side frames each coupled to each of the front frame and the rear axle case on both sides of the agricultural work vehicle; and
   a crossbar coupled to the side frames while connecting the side frames on both sides based on a second axis direction perpendicular to the first axis direction,
   wherein the front frame, the engine frame, the center case and the rear axle case are arranged and coupled in order along the first axis direction,
   wherein the crossbar is coupled to the side frames so that the crossbar is disposed behind the center case based on the first axis direction,
   wherein the crossbar overlaps the side frames along the second axis direction and is coupled to both sides of the rear axle case,
   wherein the crossbar is installed to overlap at least partly with a rear axle in the first axis direction.

2. The frame apparatus of claim 1, wherein:
   the crossbar comprises a first coupling member coupled to one of the side frames, a second coupling member coupled to a different one of the side frames, and a cross member coupled to each of the first coupling member and the second coupling member; and
   a width of the cross member is formed to be larger than a width of the first coupling member based on the first axis direction.

3. The frame apparatus of claim 1, further comprising reinforcing parts each coupled to both of the engine frame and one of the side frames;
   wherein the reinforcing parts are disposed spaced apart from the crossbar based on the first axis direction.

4. The frame apparatus of claim 3, wherein:
   each of the reinforcing parts comprises a first reinforcing coupling member coupled to the engine frame, a second reinforcing coupling member coupled to one of the side frames, and a reinforcing connection member configured to connect the first reinforcing coupling member and the second reinforcing coupling member; and
   the second reinforcing coupling member is disposed behind the first reinforcing coupling member based on the first axis direction.

5. A frame apparatus for an agricultural work vehicle, the frame apparatus comprising:
   an engine frame configured to support an engine of an agricultural work vehicle;
   a front frame connected to each of a front work machine and the engine frame to support the front work machine mounted in front of the agricultural work vehicle;
   a center case spaced apart from the front frame based on a first axis direction, and disposed behind the engine frame;
   a rear axle case coupled to a rear of the center case;
   a side frame comprising a first side member and a second side member that are each coupled to each of the front frame and the rear axle case on either sides of the agricultural work vehicle; and
   reinforcing parts disposed between the first side member and the second side member and the engine frame, and each coupled to each of the first side member and the second side member and the engine frame,
   wherein the front frame, the engine frame, the center case and the rear axle case are arranged and coupled in order along the first axis direction,
   wherein a first end of each of the first side member and the second side member is coupled to the front frame and a second end of each of the first side member and the second side member is coupled to the rear axle case,
   wherein the reinforcing parts are extended along the first axis direction, a first end of each of the reinforcing parts is coupled to the engine frame and a second end of each of the reinforcing parts is coupled to one of the first side member and the second side member, and the first end of each of the reinforcing parts is positioned forward in the first axis direction compared to the second end of each of the reinforcing parts.

6. The frame apparatus of claim 5, wherein:
   each of the reinforcing parts comprises a first reinforcing coupling member coupled to the engine frame, a second reinforcing coupling member coupled to one of the first side member and the second side member, and a reinforcing connection member configured to connect the first reinforcing coupling member and the second reinforcing coupling member; and
   the second reinforcing coupling member is disposed behind the first reinforcing coupling member based on the first axis direction.

* * * * *